United States Patent
Shindo et al.

(10) Patent No.: US 10,933,782 B2
(45) Date of Patent: Mar. 2, 2021

(54) EXCESSIVE PULL-IN PREVENTION SUSPENDER FOR SEAT COVER SUSPENSION MEMBER AND VEHICLE SEAT USING THE SAME

(71) Applicant: TACHI-S CO., LTD., Akishima (JP)

(72) Inventors: Takashi Shindo, Akishima (JP); Masahiko Takahata, Higashi-Osaka (JP); Yuuki Kumamoto, Higashi-Osaka (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 16/379,932

(22) Filed: Apr. 10, 2019

(65) Prior Publication Data

US 2019/0344690 A1 Nov. 14, 2019

(30) Foreign Application Priority Data

May 8, 2018 (JP) .............................. JP2018-089693

(51) Int. Cl.
*B60N 2/58* (2006.01)
*B68G 7/05* (2006.01)

(52) U.S. Cl.
CPC ............. *B60N 2/5883* (2013.01); *B68G 7/05* (2013.01); *B60N 2/5891* (2013.01)

(58) Field of Classification Search
CPC ............................ B60N 2/5883; B60N 2/5891
USPC ................................ 297/218.1, 218.3, 218.5
See application file for complete search history.

(56) References Cited

U.S. PATENT DOCUMENTS

| 4,865,383 | A  | * | 9/1989  | Sbaragli ............... | B60N 2/5825 297/218.2 |
| 6,478,382 | B1 | * | 11/2002 | Schulte ................... | B60N 2/58 297/218.1 |
| 7,111,373 | B2 | * | 9/2006  | Shimano ................ | B60N 2/585 29/91 |
| 7,481,489 | B2 | * | 1/2009  | Demick ............... | B60N 2/5825 297/218.1 |
| 7,506,939 | B2 | * | 3/2009  | Brockschneider ... | B60N 2/5825 297/218.2 |

(Continued)

FOREIGN PATENT DOCUMENTS

| EP | 2774807 A2 | * | 9/2014 | ........... B60N 2/5891 |
| JP | 03-003275 Y2 |   | 1/1991 | |

(Continued)

*Primary Examiner* — Rodney B White
(74) *Attorney, Agent, or Firm* — SGPatents PLLC (57) ABSTRACT

To prevent wrinkles from occurring on the outer skin member, in a vehicle seat including a urethane pad on which a groove is formed, a fixing member being embedded in the groove; trim covers covering a surface of the urethane pad; a suspender to suspend the trim covers sewn to each other for connection in the groove; and a plurality of tying members to tie the suspender with the fixing member, the suspender is provided with a seat cover suspension member and a reinforcement piece fixed to an edge portion of the seat cover suspension member, a number of slits are formed along the reinforcement piece at a portion of the seat cover suspension member where the reinforcement piece is fixed, and the plurality of tying members tie the suspender with the fixing member with a part of each of the tying members in abutment with the reinforcement piece.

14 Claims, 9 Drawing Sheets

(56) References Cited

U.S. PATENT DOCUMENTS

| | | | | |
|---|---|---|---|---|
| 8,201,880 B2* | 6/2012 | Kato | ...................... | B60N 2/002 |
| | | | | 297/218.2 X |
| 8,882,203 B2* | 11/2014 | Takehara | ............. | A47C 31/023 |
| | | | | 297/218.2 |
| 8,919,878 B2* | 12/2014 | Sakamoto | ............ | B60N 2/5825 |
| | | | | 297/218.1 |
| 8,974,004 B2* | 3/2015 | Sakamoto | ............... | B60N 2/64 |
| | | | | 297/218.1 |
| 2002/0117882 A1* | 8/2002 | Takezawa | ............ | B60N 2/5825 |
| | | | | 297/218.1 |
| 2003/0151280 A1* | 8/2003 | Hashiguchi | .......... | B60N 2/5825 |
| | | | | 297/218.1 |
| 2007/0069559 A1* | 3/2007 | Poulakis | .............. | B60N 2/5825 |
| | | | | 297/218.2 |
| 2007/0257531 A1* | 11/2007 | Mashimo | ............... | B68G 7/052 |
| | | | | 297/218.3 |
| 2014/0375105 A1* | 12/2014 | Okugawa | ............. | B60N 2/5825 |
| | | | | 297/452.18 |
| 2015/0328808 A1* | 11/2015 | Sasaki | ................. | B29C 44/1271 |
| | | | | 264/46.4 |
| 2016/0375807 A1* | 12/2016 | Kageyama | ............... | B60N 2/58 |
| | | | | 297/452.61 |
| 2017/0008436 A1* | 1/2017 | Wyatt | .................. | B60N 2/5825 |
| 2019/0031063 A1* | 1/2019 | Suzuki | ................. | B60N 2/5883 |
| 2019/0106035 A1* | 4/2019 | Goto | .................... | B60N 2/5825 |

FOREIGN PATENT DOCUMENTS

| | | | | |
|---|---|---|---|---|
| JP | 03-120900 U | | 12/1991 | |
| JP | 2016129645 A | * | 7/2016 | ............. A47C 31/02 |
| JP | 2017-012227 A | | 1/2017 | |

\* cited by examiner

EXCESSIVE PULL-IN PREVENTION SUSPENDER FOR SEAT COVER SUSPENSION MEMBER AND VEHICLE SEAT USING THE SAME

BACKGROUND

The present invention relates to a pulled-in suspender to fix the edge portion of the seat cover which covers the surface of the vehicle seat to the groove portion formed in the seat, especially, pertaining to the excessive pull-in prevention suspender for the seat cover suspension member which is provided with the function to prevent the seat cover from being excessively pulled in the groove and the vehicle seat using the same.

RELATED ART

With regard to the seat cover which covers the surface of the vehicle seat, in Japanese Examined Utility Model (Registration) Application Publication No. Hei 3-3275, there is disclosure on such arrangement as a stretchable suspension member being sewn on the edge portion of the outer skin member which covers the surface of the vehicle cushion member; and such suspension member being secured to such fixing members as wires embedded in the cushion member with hook rings.

Further, in Japanese Unexamined Utility Model (Registration) Application Publication No. Hei 3-120900, there is disclosure on such arrangement as the pulled-in suspension member sewn to the trim cover which covers the surface of the seat being provided with a plurality of notches; and the force applied upon the suspension member being pulled in being balanced with the notches spread while curved when the pulled-in suspension member is pulled up towards the insert wires integrated with a cushion pad and held in check thereto with hook rings.

Further, in Japanese Unexamined Patent Application Publication No. 2017-12227, there is disclosure on such arrangement as trim cover fixtures which are provided with a plurality of hooks and formed through molding or plastic working being attached to the opened fringe portions of the trim cover which covers the cushion pad; and the trim cover being fixed to the seat frame by the trim cover fixtures being held in place to the side frame.

SUMMARY

When the suspension member sewn to the outer skin member of the vehicle seat is held in place to the wires embedded in the cushion member using such members as a plurality of hook rings, wrinkles occur on the outer skin member unless the tensile force applied to the suspension member from the plurality of hook rings is balanced, with the result of some cases where the shapely appearance of the seat might deteriorate.

Regarding the above problem, according to the arrangement disclosed in Japanese Examined Utility Model (Registration) Application Publication No. Hei 3-3275, making the positions of the hook rings attached to the suspension member constant (the positions in the height direction of the hook rings with respect to such fixing members as wires embedded in the cushion member) permits the tensile force applied to the suspension member from the plurality of hook rings to be balanced.

Actually, however, because the operation in which the suspension member is fixed to such fixing members as wires embedded in the cushion member using hook rings is performed at the comparatively narrow spaces or gaps of the cushion member, it is liable to cause inconsistency in positions where the hook rings are attached to the suspension member. Where the positions where the hook rings are attached to the suspension member result in becoming higher than the predetermined ones (where the positions in the height direction of the hook rings with respect to such fixing members as wires embedded in the cushion member becomes higher than the predetermined ones, i.e. where the suspension member is excessively pulled in), the relevant portions of the suspension member is pulled in so harshly to the side of the wires by the hook rings as to cause wrinkles on the outer skin member.

On the other hand, according to the method disclosed in Japanese Unexamined Utility Model (Registration) Application Publication No. Hei 3-120900 by which the pulled-in suspension member is provided with the plurality of notches, the positions where the hook rings are attached to the suspension member can be made constant, thereby, preventing wrinkles from occurring on the outer skin member. However, because there is difference in attachment space of the hook rings according to the type of the seat, it is necessary that the plural kinds of pulled-in suspension members, in which the notches corresponding to each attachment space of the hook rings are formed, are prepared, which invites the problem with which the inventory of the parts of many kinds must be managed.

Further, according to the arrangement disclosed in Japanese Unexamined Patent Application Publication No. 2017-12227, the trim cover fixtures formed through molding or plastic working must be attached to the opened fringe portions of the trim cover, in which there is difference in kind of the trim cover fixture to be attached according to the type of the seat, so that it is necessary that the plural kinds of trim cover fixtures are prepared, which invites the problem with which the inventory of the parts of many kinds must be managed.

To solve the above problems with the prior art, the present invention provides an excessive pull-in prevention suspender for the seat cover suspension member which successfully prevents wrinkles from occurring on the outer skin member for general use or without regard to the type of the seat and a vehicle seat using the same.

Specifically, according to the present invention, a suspender which suspends the portion of the vehicle seat at which the trim covers thereof are sewn to each other for connection in a groove formed on a urethane pad thereof is provided with a seat cover suspension member and a reinforcement piece fixed to the edge portion of the seat cover suspension member; and has a number of slits provided along the reinforcement piece at the portion of the seat cover suspension member to which the reinforcement piece is fixed so as to act as an excessive pull-in prevention suspender for the seat cover suspension member.

Further, specifically, according to the present invention, in the vehicle seat including a urethane pad on which a groove is formed, in which groove a fixing member is embedded; the trim covers of the vehicle seat covering the surface of the urethane pad; a suspender which suspends the portion of the vehicle seat at which the trim covers are sewn to each other for connection in a groove formed on the urethane pad; and a plurality of tying members to tie the suspender with the fixing member, the suspender includes a seat cover suspension member and a reinforcement piece fixed to the edge portion of the seat cover suspension member; and has a number of slits provided along the reinforcement piece at the portion of the seat cover suspension member to which the reinforcement piece is fixed, in which the plurality of tying members is arranged such that they tie the suspender with the fixing member in such a manner that a part of each of the tying members abuts onto the reinforcement piece.

Further, specifically speaking, according to the present invention, in the vehicle seat including a seat frame provided with a side frame to which a plurality of hook members is attached; a urethane pad which is mounted to the seat frame; a trim cover covering the urethane pad; and a suspender which is sewn to the edge portion of the trim cover and suspends the edge portion of the trim cover in a plurality of hook members formed on the side frame, the suspender includes a seat cover suspension member and a reinforcement piece fixed to the edge portion of the seat cover suspension member; and has a number of slits provided along the reinforcement piece at the portion of the seat cover suspension member to which the reinforcement piece is fixed, in which the plurality of hook members is arranged such that they tie the suspender with the side frame in such a manner that a part of each of the hook members abuts onto the reinforcement piece.

Furthermore, according to the present invention, in the vehicle seat including a seat frame provided with a rear connections pipe to which a plurality of hook members is attached and a frontal frame to which a plurality of hook members is attached; a cloth member bridged between the rear connection pipe and the frontal frame of the seat frame; a first suspender to suspend the cloth member in the plurality of hook members attached to the rear connection pipe; and a second suspender to suspend the cloth member in the plurality of hook members attached to the frontal frame, the first suspender is provided with a seat cover suspension member and a reinforcement piece fixed to the edge portion of the seat cover suspension member; and has a number of slits provided along the reinforcement piece at the portion of the seat cover suspension member to which the reinforcement piece is fixed, in which the plurality of hook members attached to the rear connection pipe is arranged such that they tie the first suspender with the rear connection pipe in such a manner that a part of each of the hook members abuts on the reinforcement piece while the second suspender is provided with a seat cover suspension member and a reinforcement piece fixed to the edge portion of the seat cover suspension member; and has a number of slits provided along the reinforcement piece at the portion of the seat cover suspension member to which the reinforcement piece is fixed, in which the plurality of hook members attached to the frontal frame is arranged such that they tie the second suspender with the frontal frame in such a manner that a part of each of the hook members abuts on the reinforcement piece.

Moreover, specifically speaking, according to the present invention, in the vehicle seat including a seat frame provided with a left-hand side frame to which a plurality of hook members is attached and a right-hand side frame to which a plurality of hook members is attached; a cloth member bridged between the left-hand side frame and the right-hand side frame; a first suspender to suspend the cloth member in the plurality of hook members attached to the left-hand side frame; and a second suspender to suspend the cloth member in the plurality of hook members attached to the right-hand side frame, the first suspender is provided with a first seat cover suspension member and a first reinforcement piece fixed to the edge portion of the first seat cover suspension member; and has a number of first slits provided along the first reinforcement piece at the portion of the first seat cover suspension member to which the first reinforcement piece is fixed, in which the plurality of hook members attached to the left-hand side frame are arranged such that they tie the first suspender with the left-hand side frame in such a manner that a part of each of the hook members abuts onto the first reinforcement piece while the second suspender is provided with a second seat cover suspension member and a second reinforcement piece fixed to the edge portion of the second seat cover suspension member; and has a number of second slits provided along the second reinforcement piece at the portion of the second seat cover suspension member to which the second reinforcement piece is fixed, in which the plurality of hook members attached to the right-hand side frame are arranged such that they tie the second suspender with the right-hand side frame in such a manner that a part of each of the hook members abuts onto the second reinforcement piece.

According to the present invention, the excessive pull-in prevention suspender for the seat cover suspension member, which securely prevents wrinkles from occurring on the outer skin member for general use regardless the type of the seat, can be provided. Further, in terms of the vehicle seat, using the excessive pull-in prevention suspender for the seat cover suspension member successfully prevents wrinkles from occurring on the outer skin member for general use regardless the type of the seat.

These features and advantages of the invention will be apparent from the following more particular description of preferred embodiments of the invention, as illustrated in the accompanying drawings.

DESCRIPTION OF THE PREFERRED EMBODIMENTS

The present invention relates to a suspender to suspend the portion of the vehicle seat at which the trim covers thereof are sewn to each other for connection in a groove formed on a urethane pad thereof, especially pertaining to the suspender having a function to prevent the seat cover suspension member from being excessively pulled in for retention and the vehicle seat using the same.

The excessive pull-in prevention suspender for the seat cover suspension member according to the present invention includes the seat cover suspension member and a reinforcement piece fixed to the edge portion of the seat cover suspension member and has a number of slits provided along the reinforcement piece at the portion of the seat cover suspension member to which the reinforcement piece is fixed.

Further, according to the present invention, with the vehicle seat including a urethane pad on which a groove is formed, in which groove a fixing member is embedded; the trim covers of the vehicle seat covering the surface of the urethane pad; a suspender which suspends the portion of the vehicle seat at which the trim covers are sewn to each other for connection in a groove formed on the urethane pad; and a plurality of tying members to tie the suspender with the fixing member, the suspender has the structural arrangement as mentioned above, in which the plurality of tying members is arranged such they tie the suspender with the fixing member in such a manner that a part of each of the tying members abuts onto the reinforcement piece, thereby, preventing the suspender from excessively pulling in the seat cover suspension member for retention which successfully hampers wrinkles from occurring on the outer skin member without regard to the type of the seat or for general use.

Further, according to the present invention, such excessive pull-in prevention suspender is also applicable to the portion where the trim cover covering the surface of the urethane pad is suspended in the side frame of the seat frame.

Furthermore, according to the present invention, such excessive pull-in prevention suspender is also applicable to the cloth member attached between the rear connection pipe and the frontal frame of the seat frame, which facilitates the cloth member to be attached between the rear connection pipe and the frontal frame of the seat frame.

Moreover, according to the present invention, providing the right-hand and left-hand side frames of the seat cushion with projections allows the cloth member to be transversely retained with such side frames or to be squarely retained between the rear connection pipe and the frontal frame and between the right-hand and left-hand side frames.

Hereinafter, the preferred embodiments of the present invention are described with reference to the accompanying drawings.

First Example

Figure 1:
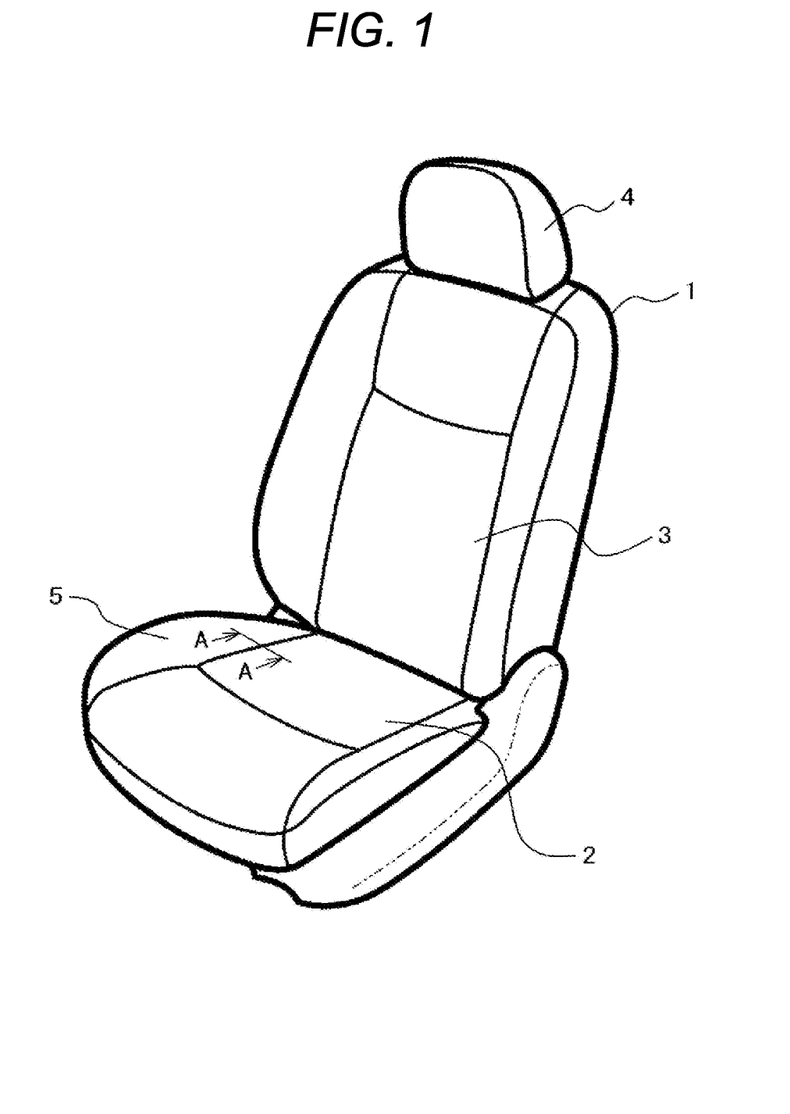
FIG. 1 is a perspective view to illustrate the outer look of the vehicle seat embodied in the present invention.

FIG. 1 illustrates the outer look of the vehicle seat 1 according to the present invention. The vehicle seat 1 according to the present invention includes a seat cushion 2 on which a passenger sits; a back rest 3 on which the passenger sitting on the seat cushion 2 reclines; and a head rest 4 to support the head of the passenger, in which a side support 5 is formed on each side of the seat cushion 2.

Figure 2:
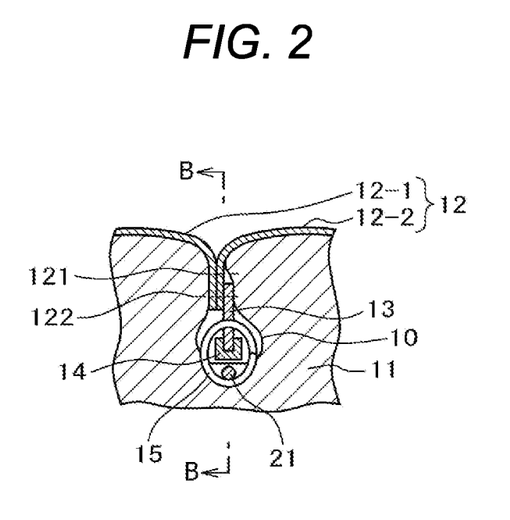
FIG. 2 is a cross-sectional view taken along A-A line of the vehicle seat illustrated in FIG. 1.

FIG. 2 is a cross-sectional view of the seat cushion 2 and the side support 5 taken along A-A line illustrated in FIG. 1. In the cross-sectional arrangement illustrated in FIG. 2, the reference sign 11 denotes a urethane pad of the seat cushion 2 and the side support 5 and that 12 denotes a trim cover covering the surface of the urethane pad 11. The reference sign 13 denotes a suspender which is made from a flexible member or a non-woven fabric and the vicinity of which upper edge portion is sewn to the trim cover 12 as well as to the lower edge portion of which a reinforcement piece 14 made from a resin is attached. The reference sign 21 denotes a wire which is embedded in the urethane pad 11.

A left-hand trim cover 12-1 and a right-hand trim cover 12-2 constituting the trim cover 12 are sewn to each other at the portion denoted with the reference sign 121 and the tip ends of such covers are sewn to the suspender 13 at the portion with a dotted line 122 in the marginal region. The portion 121 at which the left-hand trim cover 12-1 and the right-hand trim cover 12-2 are sewn to each other and the portion with the dotted line 122 in the marginal region at which the left-hand trim cover 12-1 and the right-hand trim cover 12-2 are sewn to the suspender 13 are embedded in a groove 10 formed on the urethane pad 11. Within the groove 10, the reinforcement piece 14 attached to the suspender 13 is tied and retained with a hook ring 15 to the wire 21 embedded in the urethane pad 11.

Figure 3:
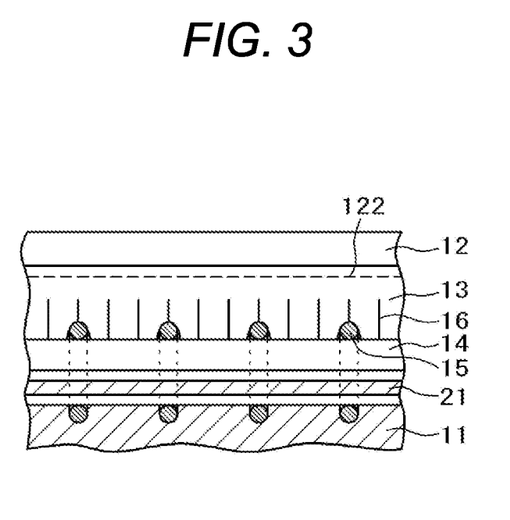
FIG. 3 is a cross-sectional view viewed from B-B direction illustrated in FIG. 2 or a cross-sectional view illustrating the state in which the hooks are mounted in the pitch alignment with the slits.

FIG. 3 is a cross-sectional view taken along B-B line illustrated in FIG. 2. In the cross-sectional arrangement illustrated in FIG. 3, the trim cover 12 and the suspender 13 are sewn to each other at the portion with the dotted line 122 in the marginal region. The reinforcement piece 14 is attached to the lower edge portion of the suspender 13 and a number of slits 16 reaching the reinforcement piece 14 are formed right above the portion of the suspender 13 where the reinforcement piece 14 is attached over the width of the reinforcement piece 14. The reinforcement piece 14 attached to the suspender 13 and the wire 21 embedded in the urethane pad 11 are tied to each other with the hook rings 15 at multiple places.

According to the example illustrated in FIG. 3, the number of the pitches of the slits 16 formed on the suspender 13 is integer times as many as that of the pitches by which the reinforcement piece and the wire are tied to each other with the hook rings 15. As a result, the hook rings 15 on the side of the suspender 13 tie the reinforcement piece 14 with the wire 21 through any ones of the slits 16 abundantly formed on the suspender 13.

In this regard, the operation by which the reinforcement piece 14 attached to the suspender 13 is tied to the wire 21 embedded in the urethane pad 11 with the hook rings 15 is carried out within the groove 10 formed on the urethane pad 11. Thus, where a number of slits 16 are not formed on the suspender 13, it is liable to cause inconsistency in the positions where the hook rings 15 are pierced through the suspender 13 with respect to the height direction from the reinforcement piece 14, so that there is likelihood that such positions at some parts of the suspender become higher than those at the other parts thereof with respect to the height direction from the reinforcement piece 14 (or higher than the reference height) or a so-called excessive pull-in might occur for retention.

In this way, once such excessive pull-in occurs, when the suspender 13 is pulled in to the side of the wire 21 with the hook rings 15, the tensile force applied to the trim cover 12 through the sewn portion (the portion with the dotted line 122) from the suspender 13 becomes larger at the portion of the suspender subjected to such excessive pull-in than the other parts thereof. This causes wrinkles to occur on the trim cover 12 covering the surface of the urethane pad 11 outside the groove 10.

On the contrary, there are formed a number of slits 16 which advantageously reach the reinforcement piece 14 on the suspender 13 according to the present example. It is arranged herein that upon the reinforcement piece 14 of the suspender 13 being tied to the wire 21 embedded in the urethane pad 11 with the hook rings 15, the hook rings 15 pass through any ones of such slits 16 abundantly formed thereon. In this regard, the length of the slit 16 is defined specifically as that ranging from 3 mm to 10 mm appropriate enough to supplement inconsistency in the positions where the hook rings 15 pass through the suspender 13 with respect to the height direction from the reinforcement piece 14. Further, the interval between the adjacent slits 16 has such a comparatively narrow pitch as ranging from 3 mm to 6 mm.

The above arrangement, at the operation carried out within the groove 10 formed on the urethane pad 11 by which the hook rings 15 are passed through the suspender 13, allows the hook rings 15 to always move to the lower edge of the slits 16 or move to the position in contact with the reinforcement piece 14 and stay there even when inconsistency might occur in the positions where the hook rings 15 pass through the suspender 13 with respect to the height direction from the reinforcement piece 14.

As a result, the reinforcement piece 14 and the wire 21 can be tied to each other with the hook rings 15 without causing any inconsistency in height from the reinforcement piece 14 among the plurality of hook rings 15, thereby, solving the problem outside of the groove 10 with which wrinkles might occur on the trim cover 12 covering the surface of the urethane pad 11.

Figure 4:
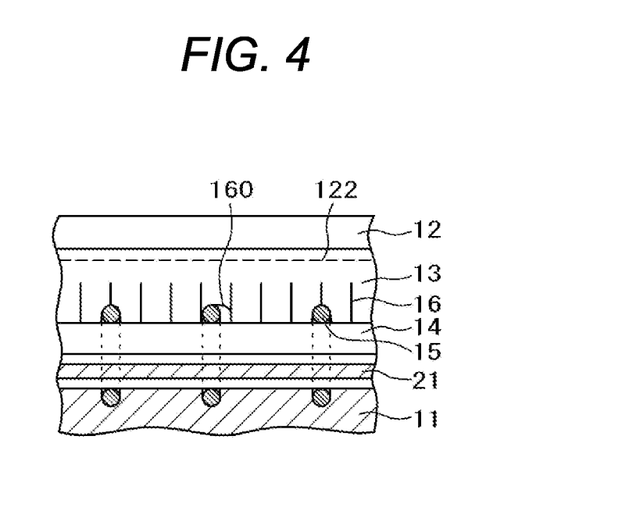
FIG. 4 is a cross-sectional view viewed from B-B direction illustrated in FIG. 2 or a cross-sectional view illustrating the state in which the hooks are mounted in the pitch misalignment with the slits, in which the slit to slit portion is partly torn apart.

According to the example illustrated in FIG. 3, it is explained on the premise that the number of the pitches of the slits 16 formed on the suspender 13 is integer times as many as that of the pitches by which the reinforcement piece and the wire are tied to each other with the hook rings 15, but the former is not necessarily integer times as many as the latter. FIG. 4 illustrates the case where the pitch of the slits 16 formed on the suspender 13 is in misalignment with that by which the reinforcement piece and the wire are tied to each other with the hook ring 15.

In the arrangement illustrated in FIG. 4, the hook rings 15 at both sides are in alignment with the positions of the slits 16 formed on the suspender 13, but the hook ring 15 in the middle is in misalignment with the position of the slit 16 formed on the suspender 13.

In this regard, the interval between the adjacent slits 6 has such a comparatively narrow pitch as ranging from 3 mm to 6 mm in the same way as explained with reference to FIG. 3. Further, the length of the slit 16 is defined specifically as that ranging from 3 mm to 10 mm appropriate enough to supplement inconsistency in the positions where the hook rings 15 pass through the suspender 13 with respect to the height direction from the reinforcement piece 14 which arises at the operation carried out within the groove 10 formed on the urethane pad 11 by which the hook rings 15 are passed through the suspender 13.

Where the position at which the hook ring 15 is passed through is in misalignment with that of the slit 16 as in the case of the hook ring 15 in the middle, the reinforcement piece and the wire are tied to each other with the hook ring 15 such that the latter is pierced between the adjacent slits 16. In this case, the cloth of the suspender 13 found between the adjacent slits 16 whose interval has a comparatively narrow pitch and which correspond to both sides of the portion where the hook ring 15 is pierced through is torn apart at the portion 160 and the hook ring 15 abuts on the reinforcement piece 14 and stay there.

The above arrangement allows the hook rings 15 to securely abut onto the reinforcement piece 14 in the state where the suspender 13 and the wire 21 are tied to each other even when the position where the hook ring 15 is passed through the suspender 13 is in misalignment with that of the slit 16 formed on the suspender 13 and further there is inconsistency in the positions where the hook rings 15 are passed through the suspender 13 with respect to the height direction from the reinforcement piece 14. As a result, uniform tensile force can be applied to the trim cover 12 by the hook rings 15 through the suspender 13, thereby, solving the problem outside of the groove 10 with which wrinkles occur on the trim cover 12 covering the surface of the urethane pad 11.

In the examples illustrated in FIGS. 3 and 4, the case is explained in which the slits 16 are equidistantly formed on the suspender 13 over the width of the attached reinforcement piece 14. The shape of the slit 16 is not limited to the one illustrated in such examples, but can be modified into various ones as illustrated in FIGS. 5 to 11.

Figure 5:
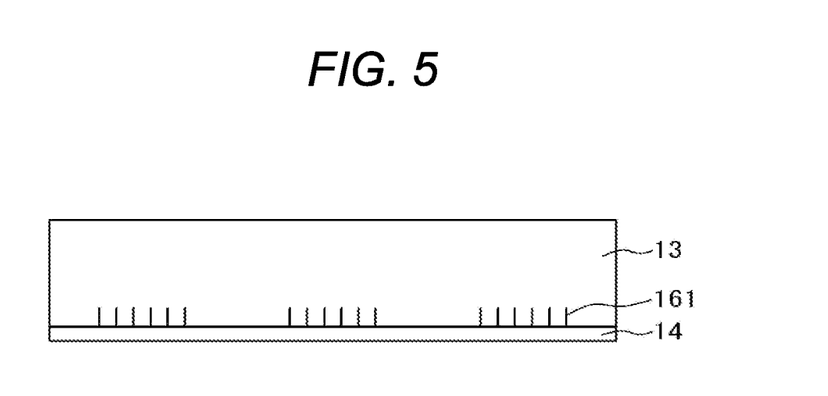
FIG. 5 illustrates a modification of the suspender embodied in the present invention or shows the frontal view of the suspender exemplifying the case where groups of the plural slits are intermittently formed.

In the examples illustrated in FIGS. 3 and 4, it is exemplified that the slits 16 with the same shape are consecutively formed on the suspender. FIG. 5 illustrates an example in which the plurality of slits 161 is defined as one group and such groups are dispersively disposed with a certain pitch. The interval (pitch) between the positions where the suspender 13 and the wire 21 are tied to each other with the hook rings 15 depends on the type of the seat, but dispersion in such interval is contained within a certain range.

Thus, the positions where the plurality of slits 161 is grouped are made to correspond to those appropriate enough to supplement a certain range of inconsistency in such interval which depends on the type of the seat or the slits are not provided to the positions where the hook rings 15 are not passed through irrespective of any types of the seat. This allows the number of the slits 161 to reduce in comparison with the case where the slits 16 are consecutively formed on the suspender as illustrated in FIGS. 3 and 4 so as to prevent the durability of the slits 161 against tensile force applied to their longitudinal direction from deterioration.

Figure 6:
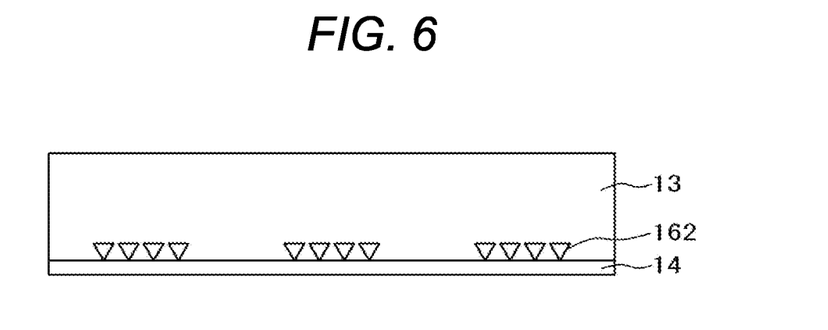
FIG. 6 illustrates a modification of the suspender embodied in the present invention or shows the frontal view of the suspender exemplifying the case where the slits shown in FIG. 5 are replaced with the ones respectively with a triangular hole.
Figure 7:
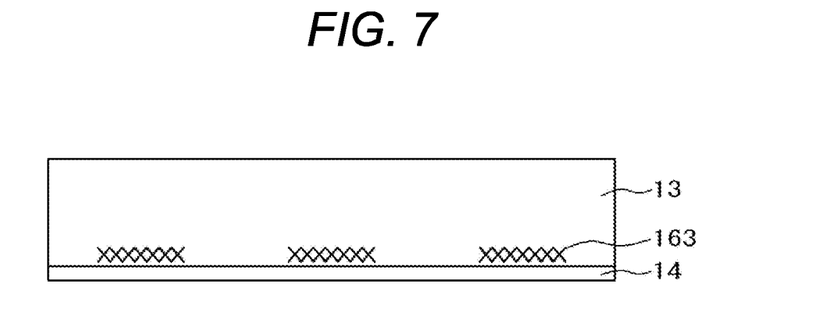
FIG. 7 illustrates a modification of the suspender embodied in the present invention or shows the frontal view of the suspender exemplifying the case where the slits shown in FIG. 5 are replaced with the ones with a mesh configuration.

FIG. 6 illustrates an example in which the slits 161 illustrated in FIG. 5 are replaced with those with triangular holes 162. In this way, making the shape of the slit have the triangular hole 162 allows the resistance with which the hook ring 15 is passed through the suspender 13 to reduce even when the position of the suspender 13 is displaced somewhat with respect to the triangular hole 162 so as to facilitate the operation. FIG. 7 illustrates an example in which the slits 161 shown in FIG. 5 are replaced with the ones with a mesh configuration 163. In this way, making the shape of the slit have the mesh configuration allows the resistance with which the hook ring 15 is passed through the suspender 13 to reduce even when the position of the suspender 13 is displaced somewhat with respect to the mesh configuration 163 so as to facilitate the operation.

Figure 8:
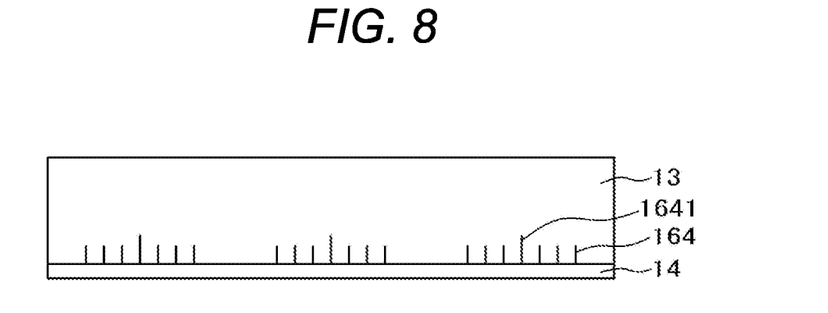
FIG. 8 illustrates a modification of the suspender embodied in the present invention or shows the frontal view of the suspender exemplifying the case where the length of some slits differs from the one of the other slits.

FIG. 8 illustrates an example in which a part of the slits included in each group of slits 161 illustrated in FIG. 5 (the slit in the middle of each group in the illustration of FIG. 8) is prolonged further than the other slits. In this way, making some of the slits 1641 formed longer than the other slits 164 allows the resistance with which the hook ring 15 is passed through the suspender 13 to reduce even when the position of the suspender 13 is displaced somewhat with respect to the slit 164 so as to facilitate the operation.

Figure 9:
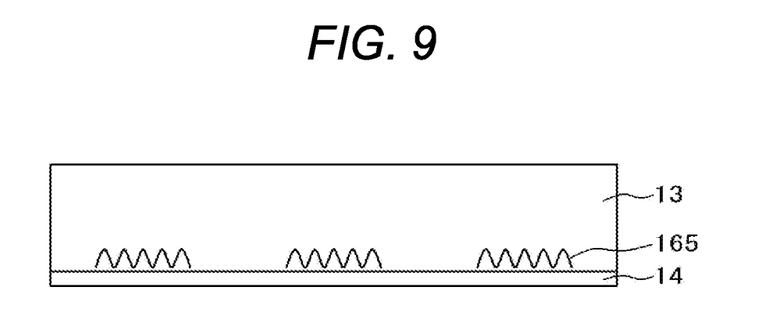
FIG. 9 illustrates a modification of the suspender embodied in the present invention or shows the frontal view of the suspender exemplifying the case where the slits shown in FIG. 5 are replaced with the ones with a wavy configuration.

FIG. 9 illustrates an example in which the slits 161 shown in FIG. 5 are replaced with the ones with a wavy configuration 165. Making the shape of the slit have the wavy configuration 165 also allows the resistance with which the hook ring 15 is passed through the suspender 13 to reduce even when the position of the suspender 13 is displaced somewhat with respect to the wavy configuration 165 so as to facilitate the operation.

Figure 10:
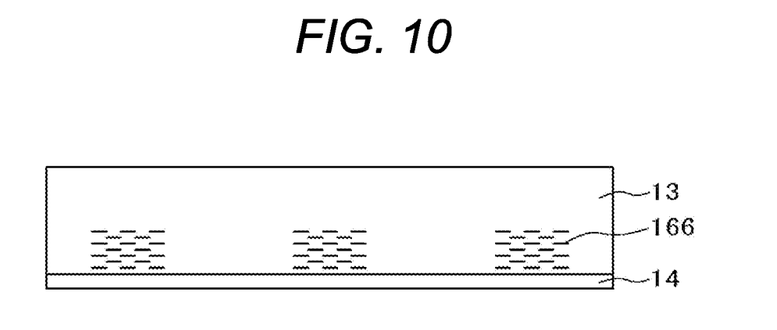
FIG. 10 illustrates a modification of the suspender or shows the frontal view of the suspender exemplifying the case where the slits shown in FIG. 5 are replaced with what a plurality of transversely long slits is vertically disposed being defined as one row and a plurality of such rows is transversely formed with phase displacement.

FIG. 10 illustrates an example in which the slits 161 shown in FIG. 5 are replaced with what a plurality of transversely long slits 166 is vertically disposed being defined as one row and a plurality of such rows is transversely formed with phase displacement. Making the slits 161 replaced with those 166 also allows the resistance with which the hook ring 15 is passed through the suspender 13 to reduce even when the position of the suspender 13 is displaced somewhat with respect to the slit 166 so as to facilitate the operation.

Figure 11:
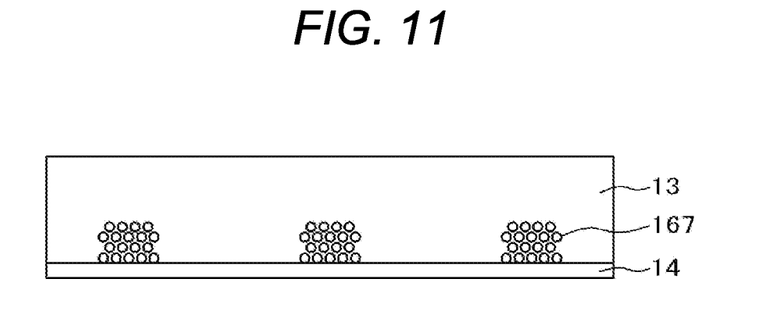
FIG. 11 illustrates a modification of the suspender embodied in the present invention or shows the frontal view of the suspender exemplifying the case where the transversely long slits shown in FIG. 10 are replaced with a plurality of minute holes.

FIG. 11 illustrates an example in which the transversely long slits 166 shown in FIG. 10 are replaced with a plurality of minute holes 167. Making the slits 166 replaced with the plurality of minute holes 167 also allows the resistance with which the hook ring 15 is passed through the suspender 13 to reduce even when the position of the suspender 13 is displaced somewhat with respect to the minute hole 167 so as to facilitate the operation.

As described above, according to the present example, by forming a plurality of slits advantageously reaching the reinforcement piece 14 on the suspender 13 with a comparatively narrow pitch between the adjacent slits so as for the plurality of hook rings 15 attached to the suspender 13 to securely abut onto the reinforcement piece 14 and stay there, it prevents the suspender from being excessively pulled in for retention with the hook rings 15, thereby, solving the problem outside of the groove 10 with which wrinkles occur on the trim cover 12 covering the surface of the urethane pad 11.

Further, forming a number of slits 16 on the suspender allows difference in the pitch by the hook rings 15 are retained which depends on the type of the seat to be supplemented, which enables the suspender 13 to be applied for general use so as to facilitate the inventory management of the suspender 13.

Second Example

As the second example of the present invention, an example in which the excessive pull-in prevention suspender is applied to the portion where the trim cover like disclosed in Japanese Unexamined Patent Application Publication No. 2017-12227 is fixed to the seat frame is described with reference to FIGS. 12 to 14.

Figure 12:
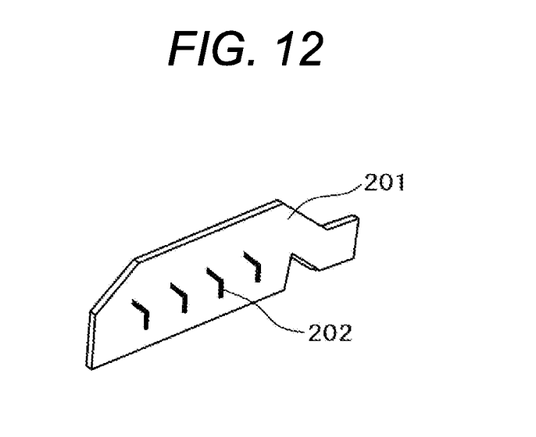
FIG. 12 is a perspective view of the side frame partly constituting the seat frame according to the second example of the present invention.

FIG. 12 illustrates a perspective view of the side frame partly constituting the seat frame. According to the arrangement disclosed in Japanese Unexamined Patent Application Publication No. 2017-12227, the wire material is fixed by welding on the plate material from which the side frame is formed; and the hooks formed on the trim cover fixtures are hooked on the welded wire material. In turn, according to the present example, the hooked members 202 are fixed by welding to the plate material 201 from which the side frame is formed; and the suspender 213 is held in check to the hooked members 202.

Figure 13:
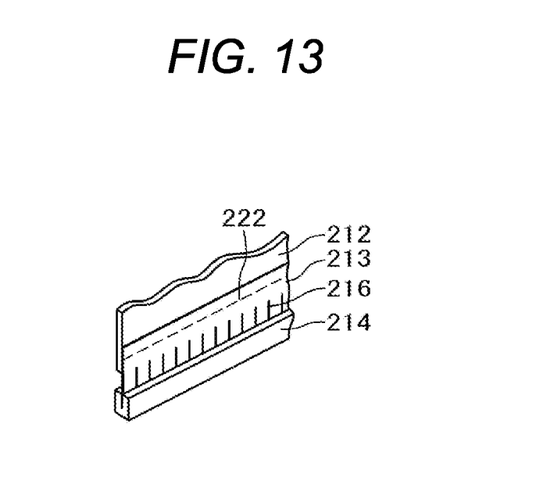
FIG. 13 is a perspective view of the suspender according to the second example of the present invention.

FIG. 13 illustrates the structural arrangement of the suspender 213 according to the present example. With the suspender 213 according to the present example, the vicinity of the upper edge surface thereof is sewn to the trim cover 212 along the line 222 indicated with a dotted line; the reinforcement piece 214 is attached to the vicinity of the lower edge surface thereof; and a number of slits 216 are formed with an equal pitch between the adjacent slits above the lower edge surface to which the reinforcement piece 214 is attached in the similar way as those explained in the first example with reference to FIGS. 3 and 4.

Figure 14:
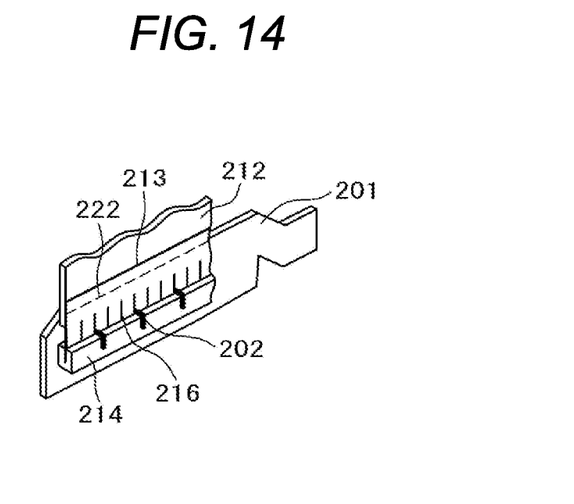
FIG. 14 is a perspective view illustrating the state in which the suspender according to the second example of the present invention is attached to the side frame.

FIG. 14 illustrates the state in which the hooked members 202 which are fixed to the plate material 201 from which the side frame explained with reference to FIG. 12 is formed are passed through the slits 216 formed on the suspender 213 explained with reference to FIG. 13 and sewn to the trim cover 212; and the reinforcement piece 214 is shoved onto the hooked members 202, thereby, the suspender 213 being held in place.

According to the present example, using the suspender 213 as illustrated in FIG. 13 allows the trim cover 212 to be uniformly pulled up, which leads to preventing wrinkles from occurring on the trim cover 212 or successfully preventing the shapely appearance thereof from deteriorating.

Further, in conjunction with the first example, sharing the suspenders 13 and 213 in stock facilitates the inventory of the parts to be managed.

Third Example

As the third example of the present invention, the arrangement in which a rigid cloth member is directly retained to the seat frame is described with reference to FIGS. 15 and 16.

Figure 15:
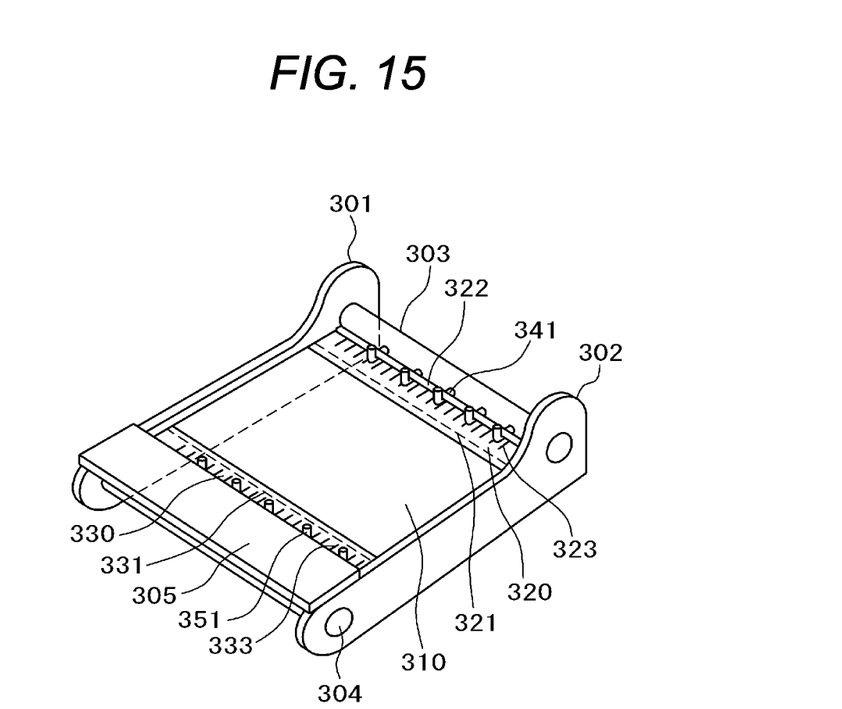
FIG. 15 is a perspective view of the seat frame illustrating the state in which the cloth member is directly retained using the suspender to the seat frame of the seat cushion according to the third example of the present invention.

FIG. 15 exemplifies the seat frame of the seat cushion 2. The seat frame of the seat cushion 2 has a frame arrangement such that the left-hand side frame 301 and the right-hand side frame 302 are connected with the rear connection pipe 303 and the frontal connection pipe 304 and the frontal parts of the side frames are further connected to each other with the frontal frame 305.

According to the present example, with the seat frame as arranged above, the cloth member 310 is directly retained between the frontal frame 305 and the rear connection pipe 303.

In other words, the hooked members 341 are attached by welding to the plural places of the rear connection pipe 303 and the hooked members 351 are attached by welding to the plural places of the frontal frame 305 as well. On the other hand, the suspender 320 having the same structural arrangement as the suspender 13 explained in the first example is sewn to the edge portion of the cloth member 310 on the side of the rear connection pipe 303 along the line 321 indicated with a dotted line; and the suspender is held in place with the hooked members 341 of the rear connection pipe 303 passed through the slits 323 formed on the suspender 320.

Further, the suspender 330 having the same arrangement as the one 13 explained in the first example is sewn to the edge portion of the cloth member 310 on the side of the frontal frame 305 along the line 331 indicated with a dotted line as well; and the suspender is held in place with the hooked members 351 welded to the frontal frame 305 passed through the slits 333 formed on the suspender 330.

Figure 16:
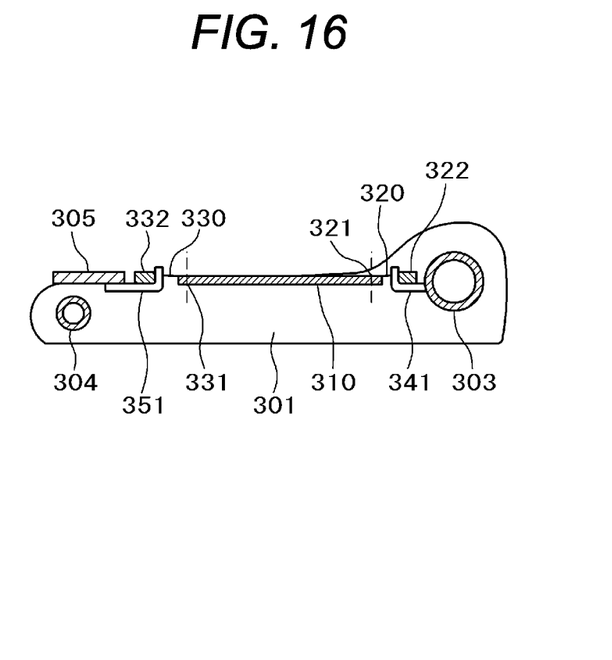
FIG. 16 is a cross-sectional view of the lateral side of the seat frame illustrating the state in which the cloth member is directly retained using the suspender to the seat frame of the seat cushion according to the third example of the present invention.

FIG. 16 is a cross-sectional view of the lateral side of the seat frame illustrating the state in which the cloth member 310 is held in check in this way. The hooked members 341 passed through the slits 323 (see FIG. 15) formed on the suspender 320 abut onto the reinforcement piece 322 fixed in the vicinity of the edge portion of the suspender 320 so as to uniformly pull up the cloth member 310 to the side of the rear connection pipe 303. Further, the hooked members 351 passed through the slits 333 (see FIG. 15) formed on the suspender 330 abut onto the reinforcement piece 332 fixed in the vicinity of the edge portion of the suspender 330 so as to uniformly pull up the cloth member 310 to the side of the frontal frame 305.

According to the present example, since the cloth member 310 can be uniformly pulled up between the rear connection pipe 303 and the frontal frame 305, the cloth member 310 can be directly retained to the seat frame without being controlled by the pitch between the fixed points at which the hooked members 341 and 351 are welded to the rear connection pipe 303 and the frontal frame 305, thereby, suppressing wrinkles from occurring on the seat cushion.

First Modified Example

Figure 17:
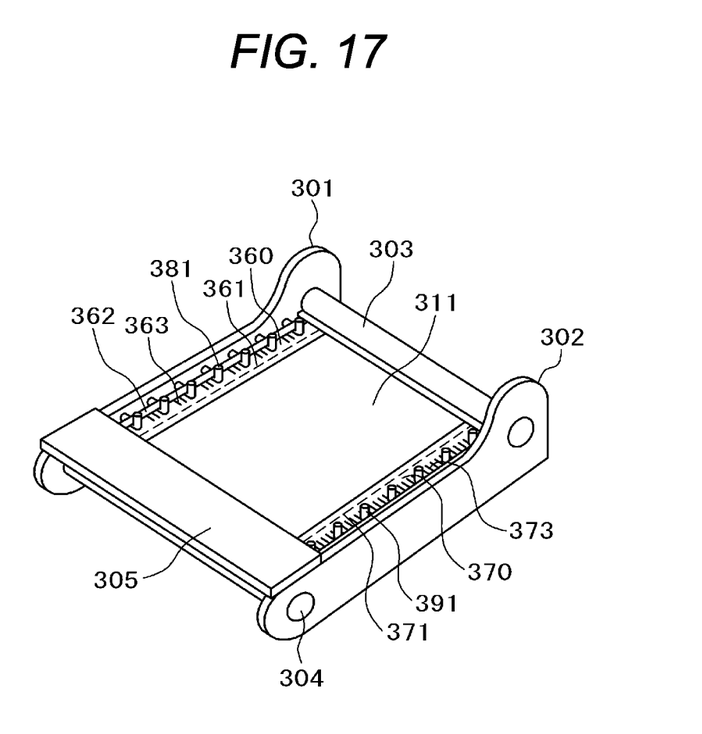
FIG. 17 is a perspective view of the seat frame illustrating the state in which the cloth member is directly retained using the suspender to the seat frame of the seat cushion according to the first modification of the third example of the present invention.

FIG. 17 illustrates the first modification of the third example.

According to the present modification, it is arranged such that the rigid cloth member 311 is directly retained between the left-hand side frame 301 and the right-hand side frame 302.

In other words, according to the present modification, the hooked members 381 are attached by welding to the plural places of the left-hand side frame 301 while the hooked members 391 are attached by welding to the plural places of the right-hand side frame 302 as well.

On the other hand, the suspender 360 having the same structural arrangement as suspender 13 explained in the first example is sewn to the edge portion of the cloth member 311 on the side of the left-hand side frame 301 along the line 361 indicated with a dotted line; and the suspender is held in place with the hooked members 391 welded to the left-hand side frame 301 passed through the slits 363 formed on the suspender 360.

Further, the suspender 370 having the same structural arrangement as suspender 13 explained in the first example is sewn to the edge portion of the cloth member 311 on the side of the right-hand side frame 302 along the line 371 indicated with a dotted line as well; and the suspender is held in place with the hooked members 391 welded to the right-hand side frame 302 passed through the slits 373 formed on the suspender 370.

The structural arrangement of the lateral side of the seat frame on the state in which the cloth member 311 is held in check in this way is the same as that explained in the third example with reference to FIG. 16, so that its explanation is omitted.

According to the present modification, since the cloth member 311 can be uniformly pulled up between the left-hand side frame 301 and the right-hand side frame 302, the cloth member 311 can be directly retained to the seat frame without being affected by the pitch between the fixed points at which the hooked members 381 and 391 are welded to the left-hand side frame 301 and the right-hand side frame 302, thereby, suppressing wrinkles from occurring on the seat cushion.

Second Modified Example

Figure 18:
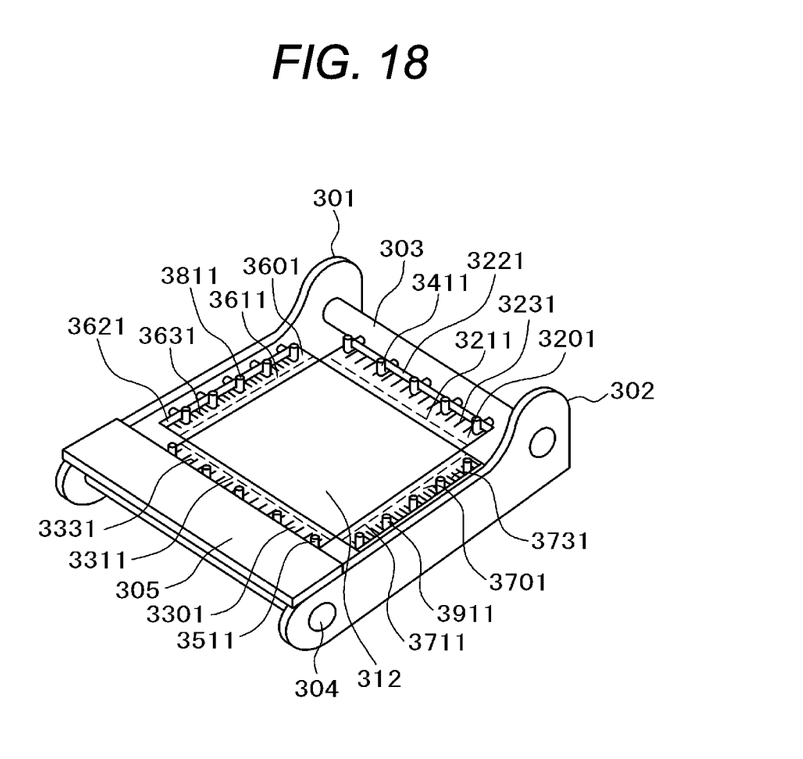
FIG. 18 is a perspective view of the seat frame illustrating the state in which the cloth member is directly retained using the suspender to the seat frame of the seat cushion according to the second modification of the third example of the present invention.

FIG. 18 illustrates the second modification of the third example.

The preset modification is such that the structural arrangement according to the third example illustrated in FIG. 15 and the structural arrangement according to the second modification illustrated in FIG. 17 are combined, in which the rigid cloth member 312 is directly retained between the frontal frame 305 and the rear connection pipe 303, and the left-hand side frame 301 and the right-hand side frame 302 respectively.

In other words, according to the present modification, the hooked members 3411 are attached by welding to the plural places of the rear connection pipe 303 while the hooked members 3511 are attached by welding to the plural places of the frontal frame 305. Likewise, the hooked members 3811 are attached by welding to the plural places of the left-hand side frame 301 while the hooked members 3911 are attached by welding to the plural places of the right-hand side frame 302 as well.

On the other hand, the suspender 3201 having the same structural arrangement as suspender 13 explained in the first example is sewn to the edge portion of the cloth member 312 on the side of the rear connection pipe 303 along the line 3211 indicated with a dotted line; and the suspender is held in place with the hooked members 3411 of the rear connection pipe 303 passed through the slits 3231 formed on the suspender 3201.

Further, the suspender 3301 having the same structural arrangement as the suspender 13 explained in the first examples is sewn to the edge portion of the cloth member 312 on the side of the frontal frame 305 along the line 3311 indicated with a dotted line as well; and the suspender is held in place with the hooked members 3511 welded to the frontal frame 3051 passed through the slits 3331 formed on the suspender 3301.

Further, the suspender 3601 having the same structural arrangement as the suspender 13 explained in the first example is sewn to the edge portion of the cloth member 312 on the side of the left-hand side frame 301 along the line 3611 indicated with a dotted line; and the suspender is held in place with the hooked members 3911 welded to the left-hand side frame 3011 passed through the slits 3631 formed on the suspender 3601.

Moreover, the suspender 3701 having the same structural arrangement as the suspender 13 explained in the first example is sewn to the edge portion of the cloth member 312 on the side of the right-hand side frame 302 along the line 3711 indicated with a dotted line as well; and the suspender is held in place with the hooked members 3911 welded to the right-hand side frame 3021 passed through the slits 3731 formed on the suspender 3701.

By retaining the cloth member 312 in this way, the hooked members 4311 passed through the slits 3231 formed on the suspender 3201 abut onto the reinforcement piece 3221 fixed in the vicinity of the edge portion of the suspender 3201 so as to uniformly pull up the cloth member 312 to the side of the rear connection pipe 303. Further, the hooked members 3511 passed through the slits 3331 formed on the suspender 3301 abut onto the reinforcement piece (not illustrated) fixed in the vicinity of the edge portion of the suspender 3301 so as to uniformly pull up the cloth ember 312 to the side of the frontal frame 305.

Likewise, the hooked members 3811 passed through the slits 3631 formed on the suspender 3601 abut onto the reinforcement piece 3621 fixed in the vicinity of the edge portion of the suspender 3601 so as to uniformly pull up the cloth member 312 to the side of the left-hand side frame 301. Further, the hooked members 3911 passed through the slits 3731 formed on the suspender 3701 abut onto the reinforcement piece (not illustrated) fixed in the vicinity of the edge portion of the suspender 3701 so as to uniformly pull up the cloth member 312 to the side of the right-hand side frame 302.

According to the present modification, since the cloth member 312 can be uniformly pulled up between the frontal frame 305 and the rear connection pipe 303 as well as between the left-hand side frame 301 and the right-hand side frame 302, the cloth member 312 can be directly retained to the seat frame without being affected by the pitch between the fixed points at which the hooked members 3411 and 3511 are welded to the rear connection pipe 303 and the frontal frame 305 as well as by the pitch between the fixed points at which the hooked members 3811 and 3911 are welded to the left-hand side frame 301 and the right-hand side frame 302, thereby, suppressing wrinkles from occurring on the seat cushion.

Furthermore, combining the structural arrangement according to the third example or that according to the first modification or the second modification with the first example or the second example allows the suspenders to be shared in stock so as to successfully facilitate the inventory of the parts to be managed.

Viewed from one aspect of the present invention described above, in an vehicle seat including a seat frame provided with a rear connection pipe to which a plurality of hooked members are attached and a frontal frame to which a plurality of hooked members are attached; a cloth member bridged between the rear connection pipe and the frontal frame of the seat frame; a first suspender to suspend the cloth member in the plurality of hooked members attached to the rear connection pipe; and a second suspender to suspend the cloth member in the plurality of hooked members attached to the frontal frame, the vehicle seat is characterized in that the first suspender is provided with a first seat cover suspension member and a first reinforcement piece fixed to an edge portion of the first seat cover suspension member, in which a number of first slits are formed along the first reinforcement piece at a portion of the first seat cover suspension member where the first reinforcement piece is fixed; and the plurality of hooked members attached to the rear connection pipe tie the first suspender with the rear connection pipe with a part of each of the hooked members in abutment with the first reinforcement piece, and the second suspender is provided with a second seat cover suspension member and a second reinforcement piece fixed to an edge portion of the second seat cover suspension member, in which a number of second slits are formed along the second reinforcement piece at a portion of the second seat cover suspension member where the second reinforcement piece is fixed; and the plurality of hooked members attached to the frontal frame tie the second suspender with the frontal frame with a part of each of the hooked members in abutment with the second reinforcement piece.

Then, the above vehicle seat is characterized in that the seat frame is further provided with a left-hand side frame to which a plurality of hooked members are attached and a right-hand side frame to which a plurality of hooked members are attached, in which the cloth member is bridged between the rear connection pipe and the frontal frame and the left-hand side frame and the right-hand side frame of the seat frame respectively; and in further including a third suspender to suspend the cloth member in the plurality of hooked members attached to the left-hand side frame and a fourth suspender to suspend the cloth member in the plurality of hooked members attached to the right-hand side frame, in which the third suspender is provided with a third seat cover suspension member and a third reinforcement piece fixed to an edge portion of the third seat cover suspension member; a number of third slits are formed along the third reinforcement piece at a portion of the third seat cover suspension member where the third reinforcement piece is fixed; the plurality of hooked members attached to the left-hand side frame tie the third suspender with the left-hand side frame with a part of each of the hooked members in abutment with the third reinforcement piece; the fourth suspender is provided with a fourth seat cover suspension member and a fourth reinforcement piece fixed to an edge portion of the fourth seat cover suspension member; a number of fourth slits are formed along the fourth reinforcement piece at a portion of the fourth seat cover suspension member where the fourth reinforcement piece is fixed; and the plurality of hooked members attached to the right-hand side frame tie the fourth suspender with the right-hand side frame with a part of each of the hooked members in abutment with the fourth reinforcement piece.

Further, viewed from another aspect of the present invention, in an vehicle seat including a seat frame provided with a left-hand side frame to which a plurality of hooked members are attached and a right-hand side frame to which a plurality of hooked members are attached; a cloth member bridged between the left-hand side frame and the right-hand side frame; a first suspender to suspend the cloth member in the plurality of hooked members attached to the left-hand side frame; and a second suspender to suspend the cloth member in the plurality of hooked members attached to the right-hand side frame, the vehicle seat is characterized in that the first suspender is provided with a first seat cover suspension member and a first reinforcement piece fixed to an edge portion of the first seat cover suspension member, in which a number of first slits are formed along the first reinforcement piece at a portion of the first seat cover suspension member where the first reinforcement piece is fixed; and the plurality of hooked members attached to the left-hand side frame tie the first suspender with the left-hand side frame with a part of each of the hooked members in abutment with the first reinforcement piece, and the second suspender is provided with a second seat cover suspension member and a second reinforcement piece fixed to an edge portion of the second seat cover suspension member, in which a number of second slits are formed along the second reinforcement piece at a portion of the second seat cover suspension member where the second reinforcement piece is fixed; and the plurality of hooked members attached to the right-hand side frame tie the second suspender with the right-hand side frame with a part of each of the hooked members in abutment with the second reinforcement piece.

Moreover, viewed from another aspect of the present invention, the vehicle seat is characterized in that the first and second seat cover suspension members are made of a non-woven fabric.

The invention may be embodied in other specific forms without departing from the spirit or essential characteristics thereof. The present embodiment is therefore to be considered in all respects as illustrative and not restrictive, the scope of the invention being indicated by the appended claims, rather than by the foregoing description, and all changes which come within the meaning and range of equivalency of the claims are therefore intended to be embraced therein.

The invention claimed is:

1. An excessive pull-in prevention suspender to suspend a portion of a vehicle seat where trim covers of the vehicle seat are sewn to each other for connection in a groove formed on a urethane pad of the vehicle seat, the suspender comprising:
    a seat cover suspension member; and
    a reinforcement piece fixed to an edge portion of the seat cover suspension member,
    wherein a number of slits, each having a longitudinal direction substantially perpendicular to a longitudinal direction of the reinforcement piece, are formed with pitches in a range of 3 mm to 6 mm along the longitudinal direction of the reinforcement piece at a portion of the seat cover suspension member where the reinforcement piece of the seat cover suspension member is fixed, and
    wherein the slits define a group and a plurality of such groups are spaced along the longitudinal direction of the reinforcement piece, with adjacent groups being spaced further apart than the pitches of the slits.

2. The excessive pull-in prevention suspender according to claim 1, wherein a number of the slits formed along the reinforcement piece are from 3 mm to 10 mm in length extending from the reinforcement piece.

3. The excessive pull-in prevention suspender according to claim 1, wherein the seat cover suspension member is provided with a marginal region to be sewn to another member on a side opposite a side to which the reinforcement piece is fixed.

4. The excessive pull-in prevention suspender according to claim 1, wherein the reinforcement piece is made from a resin.

5. The excessive pull-in prevention suspender according to claim 1, wherein the seat cover suspension member is made of a non-woven fabric.

6. A vehicle seat comprising:
    a urethane pad on which a groove is formed, a fixing member being embedded in the groove;
    trim covers covering a surface of the urethane pad;
    a suspender to suspend portions of the trim covers where they are sewn to each other for connection in the groove formed on the urethane pad; and
    a plurality of tying members to tie the suspender with the fixing member,
    wherein the suspender is provided with a seat cover suspension member and a reinforcement piece fixed to an edge portion of the seat cover suspension member,
    a number of slits, each having a longitudinal direction substantially perpendicular to a longitudinal direction of the reinforcement piece, are formed along the reinforcement piece at a portion of the seat cover suspension member where the reinforcement piece is fixed, the slits being spaced apart at predetermined pitches that are smaller than pitches between adjacent tying members, and
    the plurality of tying members tie the suspender with the fixing member, with a part of each of the tying members in abutment with the reinforcement piece.

7. The vehicle seat according to claim 6, wherein a number of the slits formed along the reinforcement piece are from 3 mm to 10 mm in length extending from the reinforcement piece.

8. The vehicle seat according to claim 6, wherein the seat cover suspension member of the suspender is provided with a marginal region sewn to another member on a side opposite a side to which the reinforcement piece is fixed.

9. The vehicle seat according to claim 6, wherein the reinforcement piece of the suspender is made from a resin.

10. The vehicle seat according to claim 6, wherein the slits define a group and a plurality of such groups are spaced along the longitudinal direction of the reinforcement piece, with adjacent groups being spaced further apart than the pitches of the slits.

11. The vehicle seat according to claim 6, wherein some of the plurality of tying members tie the suspender with the fixing member with tearing apart a cloth of the suspender between adjacent slits among a number of the slits formed on the suspender so as to abut onto the reinforcement piece.

12. The vehicle seat according to claim 6, wherein the seat cover suspension member is made of a non-woven fabric.

13. A vehicle seat comprising:
    a seat frame provided with a side frame to which a plurality of hooked members are attached;
    a urethane pad mounted to the seat frame;
    a trim cover covering a surface of the urethane pad; and
    a suspender which is sewn to an edge portion of the trim cover and suspends the edge portion of the trim cover from the plurality of hooked members formed on the side frame,
    wherein the suspender is provided with a seat cover suspension member and a reinforcement piece fixed to an edge portion of the seat cover suspension member,
    a number of slits, each having a longitudinal direction substantially perpendicular to a longitudinal direction of the reinforcement piece, are formed along the reinforcement piece at a portion of the seat cover suspension member where the reinforcement piece is fixed, the slits being spaced apart at predetermined pitches that are smaller than pitches between adjacent hooked members, and
    the plurality of hooked members tie the suspender with the side frame, with a part of each of the hooked members in abutment with the reinforcement piece.

14. The vehicle seat according to claim 13, wherein the seat cover suspension member is made of a non-woven fabric.

\* \* \* \* \*